United States Patent
Takamizawa

(10) Patent No.: US 11,967,148 B2
(45) Date of Patent: Apr. 23, 2024

(54) DISPLAY DEVICE AND DISPLAY METHOD

(71) Applicant: MAXELL, LTD., Kyoto (JP)

(72) Inventor: Naohisa Takamizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/776,307

(22) PCT Filed: Nov. 15, 2019

(86) PCT No.: PCT/JP2019/044879
§ 371 (c)(1),
(2) Date: May 12, 2022

(87) PCT Pub. No.: WO2021/095235
PCT Pub. Date: May 20, 2021

(65) Prior Publication Data
US 2022/0406057 A1    Dec. 22, 2022

(51) Int. Cl.
*G06V 20/20* (2022.01)
*G04G 21/02* (2010.01)
*G06F 3/01* (2006.01)
*G06Q 10/1093* (2023.01)
*G06T 11/00* (2006.01)

(52) U.S. Cl.
CPC ............ *G06V 20/20* (2022.01); *G04G 21/02* (2013.01); *G06F 3/013* (2013.01); *G06Q 10/1095* (2013.01); *G06T 11/00* (2013.01); *G06V 2201/02* (2022.01)

(58) Field of Classification Search
CPC .............................. G06V 20/20; G06T 19/006
See application file for complete search history.

(56) References Cited

U.S. PATENT DOCUMENTS 9,189,021 B2    11/2015  Jerauld
2011/0159928 A1  6/2011  Nii
(Continued)

FOREIGN PATENT DOCUMENTS

JP    2011-135346 A    7/2011
JP    2011-227644 A    11/2011
(Continued)

OTHER PUBLICATIONS

International Search Report of PCT/JP2019/044879 dated Feb. 4, 2020.

*Primary Examiner* — Shivang I Patel
(74) *Attorney, Agent, or Firm* — Mattingly & Malur, PC

(57) ABSTRACT

In a display device 100, a photographing unit 12 is configured to photograph the surroundings of the display device 100, and the recognizing unit 16 is configured to recognize a clock 300 (a real object regarding a time or date) from a result of the photographing. When the recognizing unit 16 recognizes the clock 300, the schedule obtaining unit 11 is configured to obtain schedule information, and the display controller 17 is configured to display and output the schedule information in accordance with a position of the clock 300. In this case, since the display device 100 displays the schedule information in accordance with the position of the clock 300, the schedule information can be displayed in association with actual environment, and the schedule information can be outputted in a format that is easier to recognize the schedule information.

5 Claims, 7 Drawing Sheets

(56) References Cited

U.S. PATENT DOCUMENTS

| | | | |
|---|---|---|---|
| 2013/0027430 A1 | 1/2013 | Matsuda et al. | |
| 2016/0109957 A1* | 4/2016 | Takashima | G06F 3/0425 345/8 |
| 2016/0320622 A1 | 11/2016 | Yoshida et al. | |
| 2017/0092010 A1* | 3/2017 | Hato | G06T 19/006 |

FOREIGN PATENT DOCUMENTS

| | | |
|---|---|---|
| JP | 2015-078943 A | 4/2015 |
| JP | 2016-506562 A | 3/2016 |
| JP | 2017-120556 A | 7/2017 |
| WO | 2015/107625 A1 | 7/2015 |
| WO | 2015/189973 A1 | 12/2015 |

* cited by examiner

FIG. 7
(a) 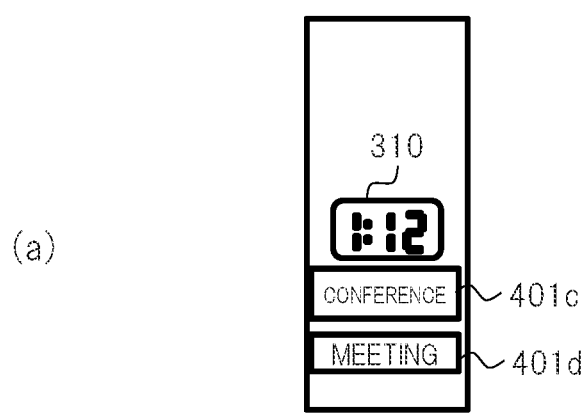
(b) 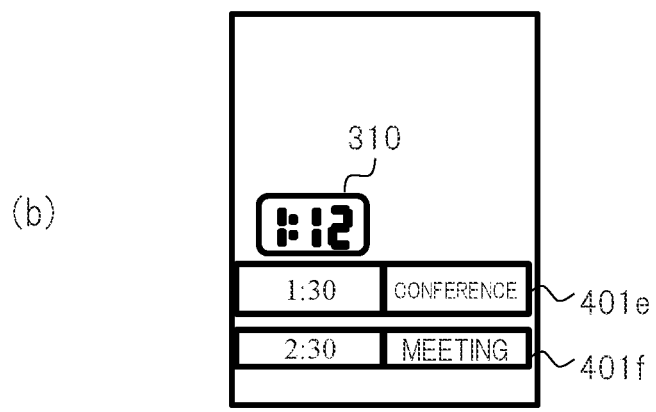

DISPLAY DEVICE AND DISPLAY METHOD

TECHNICAL FIELD

The present invention relates to a display device and a display method.

BACKGROUND ART

Conventionally, there have been head mounted displays using augmented reality, and there is a technique for displaying schedule information by using the head mounted display (for example, Patent Document 1).

RELATED ART DOCUMENTS

Patent Documents

Patent Document 1: Japanese Patent Application Laid-Open Publication No. 2017-120556

SUMMARY OF THE INVENTION

Problems to be Solved by the Invention

In a technique disclosed in Patent Document 1 described above, when a user who wears a head mounted display looks at a clock, the head mounted display displays schedule information accordingly. It is desirable that such schedule information is displayed in association with actual environment. Namely, displaying it in fusion with an actual object can provide more useful information for the user.

It is an object of the present invention to display schedule information in association with actual environment.

The foregoing and other objects, and new features of the present invention will become more apparent from the detailed description of the present specification and the appending drawings.

Means for Solving the Problem

Techniques described in the claims are used as means for solving the problem.

As one example, a display device for displaying schedule information, which allows a user to be worn, includes: a schedule obtaining unit configured to obtain schedule information; a photographing unit configured to photograph surroundings of the display device; a recognizing unit configured to recognize a real object regarding a time or date from a result photographed by the photographing unit; and a display controller configured to display and output the schedule information obtained by the schedule obtaining unit in accordance with a position of the real object regarding the time or date in a case where the recognizing unit recognizes the real object regarding the time or date.

Effects of the Invention

By using the technique of the present invention, it is possible to display schedule information in association with actual environment.

BRIEF DESCRIPTIONS OF THE DRAWINGS

FIG. 7 is a diagram illustrating a display example of a digital wristwatch.

DETAILED DESCRIPTION OF EMBODIMENTS

Hereinafter, an example of an embodiment of the present invention will be described with reference to the drawings.

Figure 1:
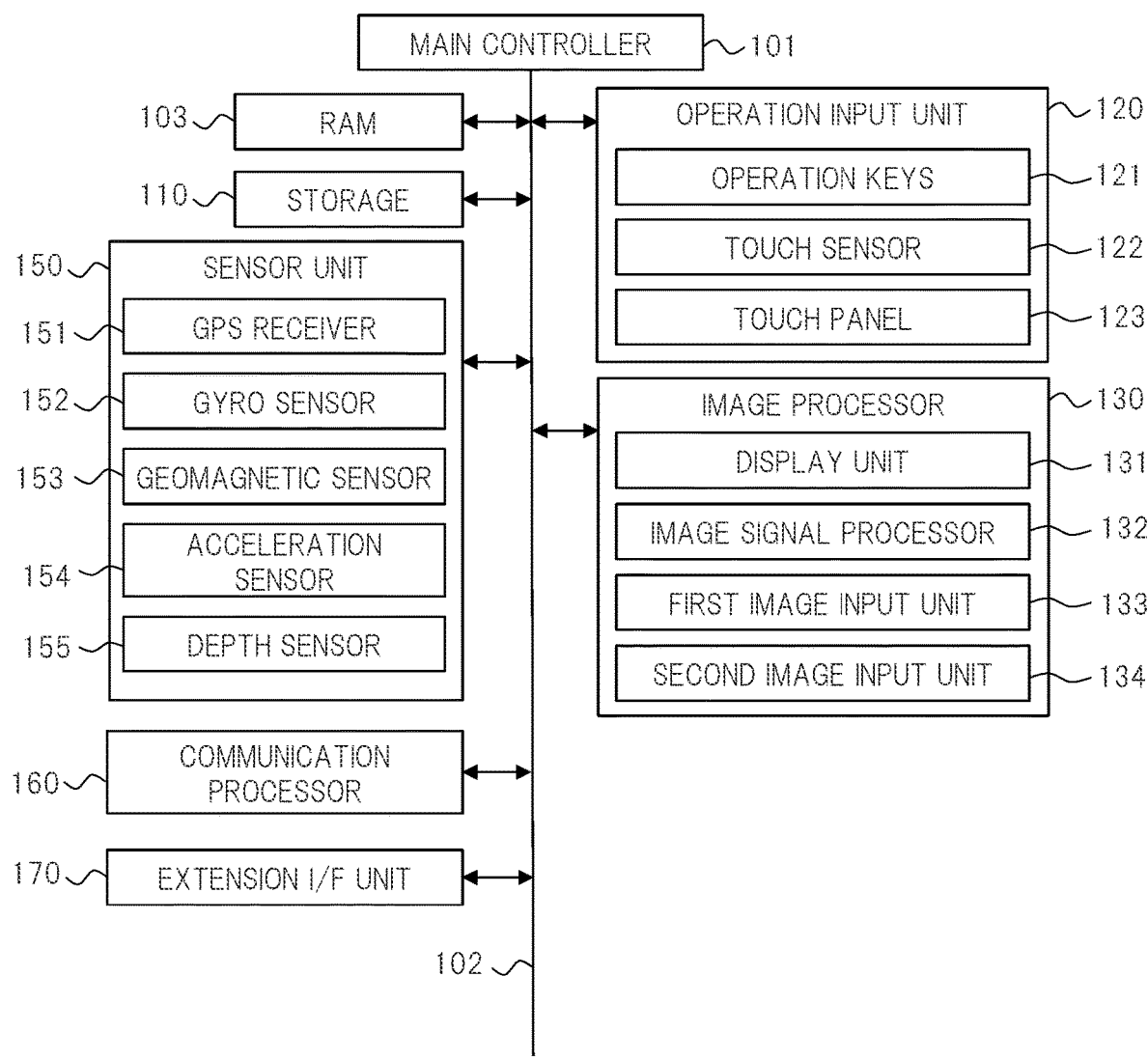
FIG. 1 is a diagram for explaining a hardware configuration of a display device according to the present embodiment.

First, a hardware configuration of a display device 100 will be described with reference to FIG. 1. FIG. 1 is a diagram for explaining a hardware configuration of the display device 100. This display device 100 is a device that a user can wear, and specifically, it is a head mounted display device. This head mounted display is a device that displays and executes various kinds of applications (for example, an application configured to output schedule information) so that the user can visually recognize them in a state where the user wears the head mounted display on his or her head. Note that the display device 100 may be a glasses-type head mounted display.

The display device 100 has a main controller 101 to control respective units via a bus 102. This main controller 101 is a CPU (Central Processing Unit) or the like. Further, the display device 100 includes a RAM 103, a storage 110, an operation input unit 120, an image processor 130, a sensor unit 150, a communication processor 160, and an extension I/F unit 170.

The operation input unit 120 includes operation keys 121, a touch sensor 122, and a touch panel 123. The image processor 130 includes a display unit 131, an image signal processor 132, a first image input unit 133, and a second image input unit 134.

The main controller 101 is an arithmetic processing apparatus that execute various kinds of information processing programs stored in the storage 110 to execute various kinds of functions. The RAM 103 becomes a work area at the time of execution of the various kinds of programs. The storage 110 is a part configured to store images taken by the first image input unit 133 or the second image input unit 134 based on a control of the main controller 101, and various kinds of information. The storage 110 is a non-volatile storage medium such as a Flash ROM or an EEPROM.

The operation input unit 120 is a user operation I/F configured to receive an operational input. The operation keys 121 are physical keys installed at a predetermined position of the display device 100 (for example, a power key, a volume key, a home key, and the like). The touch sensor 122 is an input sensor installed in a housing or the like of the display device 100. The touch panel 123 is included in the display device 100.

The image processor 130 is realized by an image (video) processor or the like. In a case where the display unit 131 is a see-through type (or a transmission type) of display device, the display unit 131 is configured to superimpose and display an object on an actual image in a transparent type manner. Further, in a case where the display unit 131 is a non-transparent display device, the display unit 131 is configured to superimpose and display an object on a camera-through image in a non-transparent type manner The image signal processor 132 is an image signal processor, and is a part configured to analyze an image by the first image input unit 133 or the second image input unit 134 and output an analysis result to the main controller 101 or the like.

The first image input unit 133 is a part configured to take an image of the outside. The second image input unit 134 is a part configured to take an image of eyes of the user.

The sensor unit 150 is a part configured to obtain information for specifying a position and a direction of the display device 100. The sensor unit 150 includes a GPS receiver 151, a gyro sensor 152, a geomagnetic sensor 153, an acceleration sensor 154, and a depth sensor 155.

The GPS receiver 151 receives a GPS signal to obtain GPS information. The gyro sensor 152 has a function to detect a moving direction of the display device 100, and obtains gyro information indicating angular velocity data accompanying a change in the direction of the display device 100. The geomagnetic sensor 153 is one type of an orientation detector configured to detect an angle indicating absolute orientation of the display device 100 on the basis of earth magnetism. As such an angle, for example, an azimuth angle can be cited. The acceleration sensor 154 has a function to detect at least one of an acceleration or an inclined angle of the display device 100. The sensor unit 150 may further include a proximity sensor, an illuminance sensor, and the like. The depth sensor 155 is a so-called 3D sensor, which is a sensor that can capture a shape of an object such as a person or an object as a three-dimensional object by using distance information measured in a plane shape.

The communication processor 160 is a communication processor configured to control wireless communication. The communication processor 160 is configured to transmit and receive information to and from an external device via a LAN or the like. The extension I/F unit 170 is an interface for connecting to peripheral devices.

Figure 2:
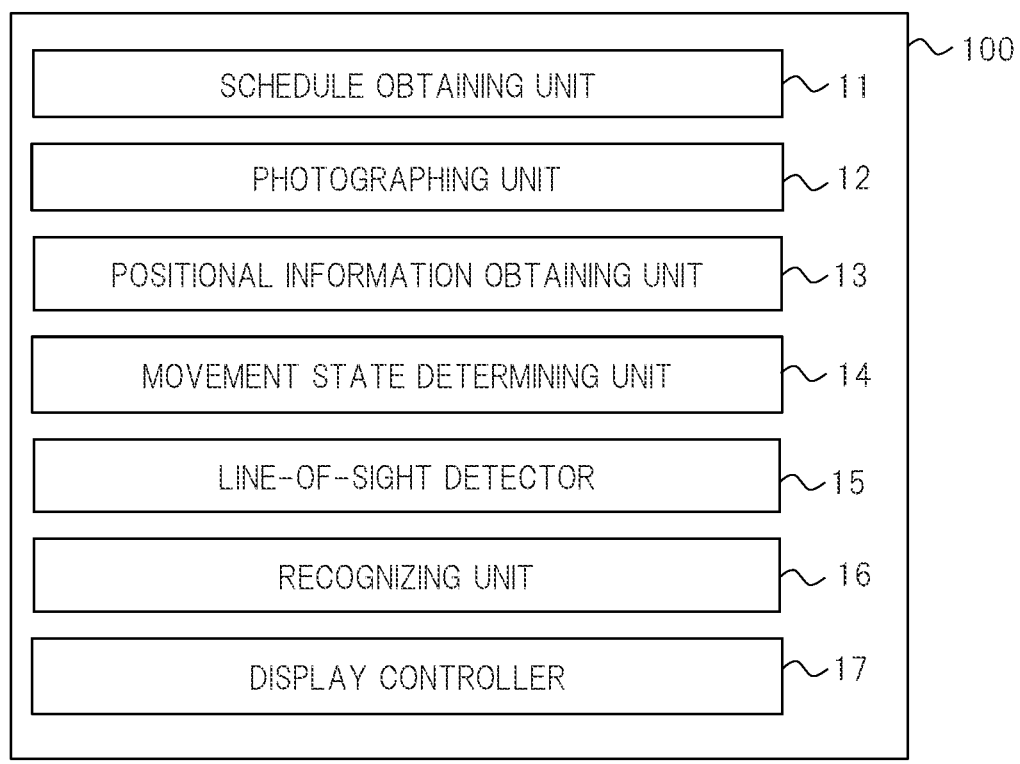
FIG. 2 is a functional block diagram of the display device according to the present embodiment.

Subsequently, functions of the display device 100 will be described with reference to FIG. 2. FIG. 2 is a functional block diagram of the display device 100. The display device 100 includes a schedule obtaining unit 11, a photographing unit 12, a positional information obtaining unit 13, a movement state determining unit 14, a line-of-sight detector 15, a recognizing unit 16, and a display controller 17. Note that these functions are realized by executing the various kinds of programs stored in the storage 110. Further, the display device 100 has functions other than the functions illustrated in FIG. 2.

The schedule obtaining unit 11 is a part configured to obtain schedule information. The schedule obtaining unit 11 obtains the schedule information stored in the storage 110 in advance at predetermined timing, for example. As the timing, there is a case where the recognizing unit (will be described later) recognizes a real object such as a clock.

Here, the schedule information at least contains schedule content (for example, information regarding business trips, reservations, and the like) and information regarding a time when the schedule is to be executed (a start time of a schedule, an end time of the schedule, and the like). Further, a category may be associated with the schedule information. Here, the category indicates a place (for example, a house, a conference room, and the like) where the schedule information is displayed.

The schedule obtaining unit 11 may be configured to obtain schedule information after a current time based on an internal clock of the display device 100.

The photographing unit 12 is a part configured to photograph the surroundings of the display device 100. The photographing unit 12 starts photographing at predetermined timing. The photographing unit 12 is realized by the first image input unit 133 or the like, for example. The photographing unit 12 photographs the surroundings of the display device 100 at predetermined timing, and sends a photographed result (hereinafter, referred to as a "photographed result") to the recognizing unit 16.

The positional information obtaining unit 13 is a part configured to obtain positional information, which is information regarding a position of the display device 100. The positional information obtaining unit 13 is realized by the GPS receiver 151 or the like, for example. The positional information obtaining unit 13 sends a signal thus obtained to the movement state determining unit 14 and the display controller 17.

The movement state determining unit 14 is a part configured to determine whether the user is moving or not on the basis of a change in the positional information obtained by the positional information obtaining unit 13. The movement state determining unit 14 is realized by the main controller 101 or the like, for example. The movement state determining unit 14 obtains the positional information from the positional information obtaining unit 13, and determines that the user is moving in a case where the change in the obtained positional information exceeds a standard defined in advance. Further, the movement state determining unit 14 may be configured to determine that the user is moving in a case where there is a change in facility specified by a known technique, such as matching with facility positional information contained in map information held in advance, on the basis of the positional information by the positional information obtaining unit 13.

The movement state determining unit 14 may determine whether the user is moving or not by a known technique such as autonomous navigation positioning based on not only the positional information but also other information (for example, a result by another sensor of the sensor unit 150).

The line-of-sight detector 15 is a part configured to detect a line of sight of the user. The line-of-sight detector 15 is realized by the second image input unit 134 and the image signal processor 132, or the like, for example. Specifically, the image signal processor 132 specifies a destination of the line of sight of the user on the basis of a state of the eyes of the user photographed by the second image input unit 134 by a known technique such as eye tracking using corneal reflex. The line-of-sight detector 15 sends information indicating the specified destination of the line of sight of the user to the display controller 17.

The recognizing unit 16 is a part configured to recognize a real object regarding a time or date from the result photographed by the photographing unit 12. The recognizing unit 16 is realized by the main controller 101, for example. When the recognizing unit 16 obtains the photographed result from the photographing unit 12, the recognizing unit 16 analyzes an image of the photographed result, and determines whether the real object regarding the time or date is included in the photographed result or not by a known technique of image recognition.

Here, the real object regarding the time or date is a clock in a room, a wristwatch worn by the user, a calendar in the room, or the like.

In a case where the real object regarding the time or date is included in the photographed result, the recognizing unit 16 also specifies a position of the real object on the basis of the photographed result. Further, in a case where the real object is a clock, the recognizing unit 16 also recognizes a time indicated by the clock by the known technique of the image recognition. Further, similarly, the recognizing unit 16 also recognizes the position of the real object (for example, a relative position with respect to the front of the user) on the basis of the photographed result by the known technique of the image recognition.

In a case where the real object is included, the recognizing unit 16 notifies the display controller 17 of the position and the time (if the real object is a clock) of the real object.

In a case where the recognizing unit 16 recognizes the real object regarding the time or date, the display controller 17 is configured to display and output the schedule information obtained by the schedule obtaining unit 11 in accordance with the position of the real object regarding the time or date. The display controller 17 is realized by the main controller 101, for example.

The display controller 17 obtains the position and the time of the real object from the recognizing unit 16, and obtains the schedule information from the schedule obtaining unit 11. The display controller 17 displays and outputs the schedule information in accordance with the position of the real object recognized by the recognizing unit 16. Here, an example of display control will be described with reference to FIG. 3 and FIG. 4.

Figure 3:
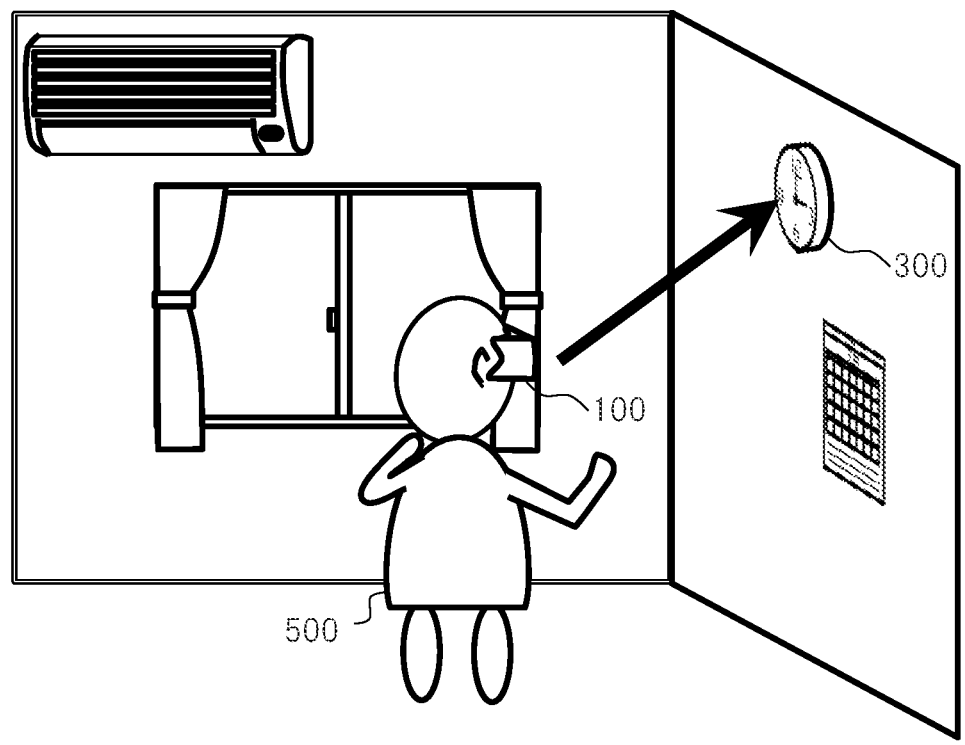
FIG. 3 is a diagram for explaining a case where a user who wears the display device refers to a clock as a real object.

FIG. 3 is a diagram for explaining a case where a user 500 who wears the display device 100 refers to a clock 300 as a real object. As illustrated in FIG. 3, when the user 500 who wears the display device 100 looks at the clock 300, the clock 300 enters a photographing range. Therefore, the recognizing unit 16 recognizes the clock 300. Further, the recognizing unit 16 also recognizes a time indicated by the clock 300.

Note that when the recognizing unit 16 recognizes the clock 300, the display controller 17 obtains schedule information from the schedule obtaining unit 11. The display controller 17 displays the schedule information obtained by the schedule obtaining unit 11 in accordance with a position of the clock 300 recognized by the recognizing unit 16.

Figure 4:
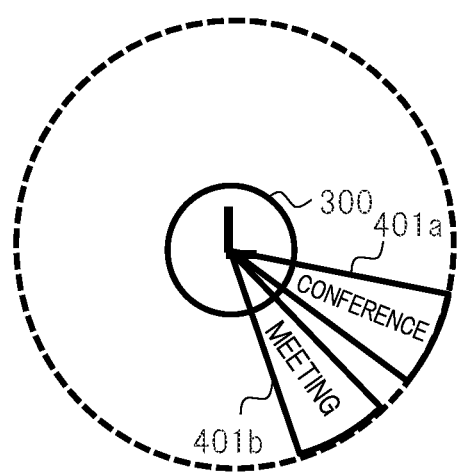
FIG. 4 is a diagram for explaining a display example of schedule information.

FIG. 4 is a diagram for explaining a display example of the schedule information. As illustrated in FIG. 4, the display controller 17 displays and outputs the content 401a of schedule information and the content 401b of schedule information in accordance with the position of the clock 300.

In case of the example illustrated in FIG. 4, it indicates that there is a schedule of a conference around o'clock, and indicates that there is a schedule of a meeting around 17 o'clock.

Note that the display controller 17 may be configured to compare a time managed by the display device 100 (a so-called internal clock) with a time recognized by the recognizing unit 16, and output information indicating that effect in a case where there is a difference as a result of the comparison. For example, in a case where the display controller 17 compares the time recognized by the recognizing unit 16 with the time managed by the display device 100 and the result is different by a permissible error time defined in advance (for example, 10 minutes) or longer, the display controller 17 displays and outputs information indicating that they are different from each other. Further, the display controller 17 may indicate how much the different is (for example, a delay of 15 minutes, or the like) as the information indicating that they are different from each other.

As described above, by comparing the time managed by the display device 100 with the time recognized by the recognizing unit 16 and displaying that effect in a case where they are different from each other, it is possible to alert the user to that effect. This makes it possible to avoid the display device 100 from displaying the schedule information in accordance with a local clock having a time difference, a clock that has not been adjusted, or the like to cause an inconvenient situation for the user (such as being late).

Further, the display controller 17 may display and output the schedule information of the category information corresponding to the positional information obtained by the positional information obtaining unit 13.

For example, the display controller 17 determines which facility the user is in on the basis of the positional information obtained by the positional information obtaining unit 13 by using a known technique such as matching by a database using map information or the like held in advance. the display controller 17 extracts schedule information associated with a category corresponding to the facility, and displays the extracted schedule information.

For example, in a case where the display controller 17 determines that the user is at home on the basis of the positional information obtained by the positional information obtaining unit 13, the display controller 17 displays schedule information of a private category. Further, in a case where the display controller 17 determines that the user is in a conference room of a company or the like, the display controller 17 displays schedule information indicating a schedule of use of the conference room when the recognizing unit 16 recognizes a clock in the conference room. By changing the schedule to be displayed depending upon the position where the user is present in this manner, it is possible to narrow down the display of the schedule desired by the user.

Further, in a case where the line of sight detected by the line-of-sight detector 15 corresponds to the position of the real object recognized by the recognizing unit 16, the display controller 17 may display and output the schedule information in accordance with the position of the real object recognized by the recognizing unit 16. A method of determining whether the line of sight detected by the line-of-sight detector 15 corresponds to the position of the real object recognized by the recognizing unit 16 or not can be realized by the known technique such as the eye tracking using corneal reflex, for example.

As described above, the display device 100 can display the schedule information at appropriate timing by displaying and outputting the schedule information on condition that it is detected that the line of sight of the user is aligned with the real object.

Further, the display controller 17 may extract schedule information after the time indicated by the real object recognized by the recognizing unit 16, display and output it. As a result, the display device 100 can narrow down the schedule information necessary for the user, display and output it.

Figure 5:
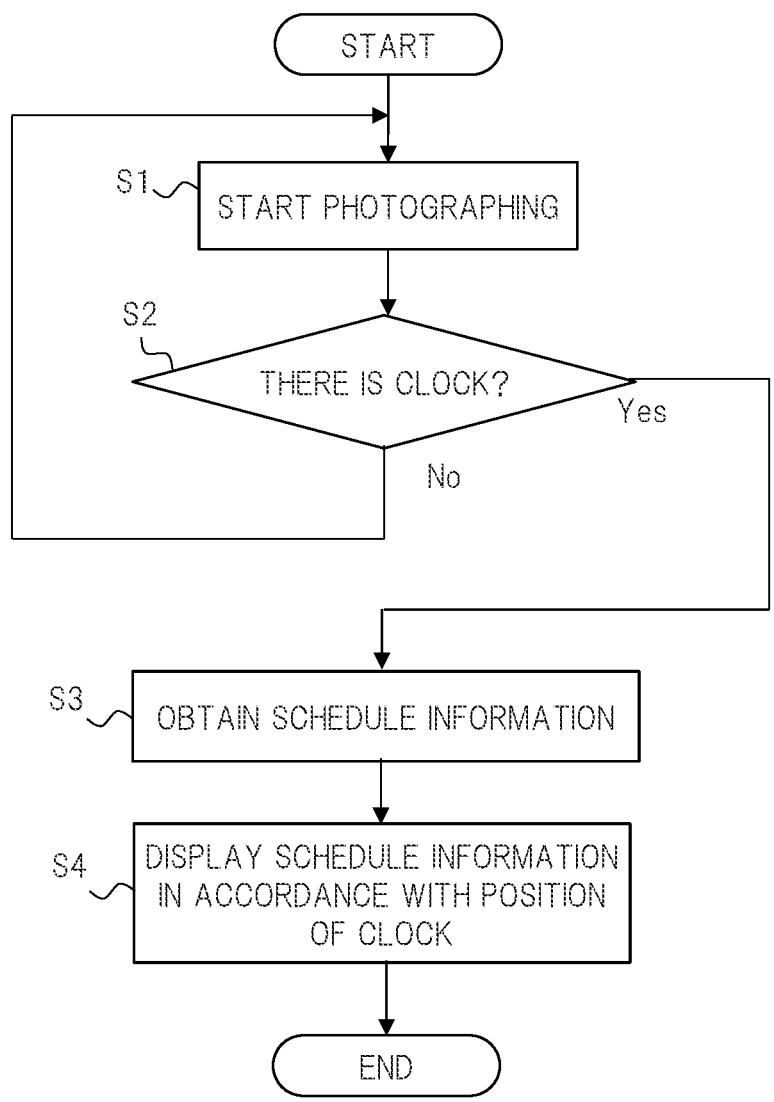
FIG. 5 is a flowchart for explaining a processing procedure for displaying the schedule information in accordance with a position of the clock.

Subsequently, a processing procedure for displaying schedule information in accordance with a position of a clock will be described with reference to FIG. 5. FIG. 5 is a flowchart for explaining the processing procedure for displaying the schedule information in accordance with the position of the clock.

First, the photographing unit 12 of the display device 100 photographs the surroundings of the display device 100 at predetermined timing (Step S1).

The recognizing unit 16 executes image processing for a result photographed by the photographing unit 12, and determines whether there is a clock or not (Step S2). In a case where the recognizing unit 16 determines that there is no clock by the image processing described above (Step S2: No), the processing flow proceeds to Step S1.

In a case where the recognizing unit 16 determines that there is a clock by image processing described above (Step S2: Yes), the schedule obtaining unit 11 obtains schedule information (Step S3). Then, the display controller 17 displays and outputs the schedule information in accordance with a position of the clock (Step S4).

Although it has not been mentioned particularly in the embodiment described above, the schedule obtaining unit 11 may communicate with an external server apparatus to obtain the schedule information.

Although it has not been mentioned particularly in the embodiment described above, the display controller 17 may display schedule information in a helical manner with respect to a Z axis direction (a depth direction) in a case where a schedule to be displayed is 12 hours or longer at the time of displaying the schedule information on the clock. Further, the display controller 17 may display schedule information for the next day by exceeding 24 hours. Further, the display controller 17 may narrow down schedule information into an AM portion or a PM portion thereof depending upon a time (for example, a current time indicated by the internal clock), and display the narrowed-down schedule information.

Although it has not been mentioned particularly in the embodiment described above, the display controller 17 display schedule information on an X-Y plane in a spiral manner when the schedule information is displayed on the clock.

Further, the example in which the clock is recognized as the real object has been described in the embodiment described above. However, a calendar may be recognized.

Further, the example in which the schedule information is displayed in a circular shape in accordance with a shape of an analog clock has been described in the embodiment described above. However, a clock may be displayed as AR, and display the schedule information on the clock displayed as the AR.

Figure 6:
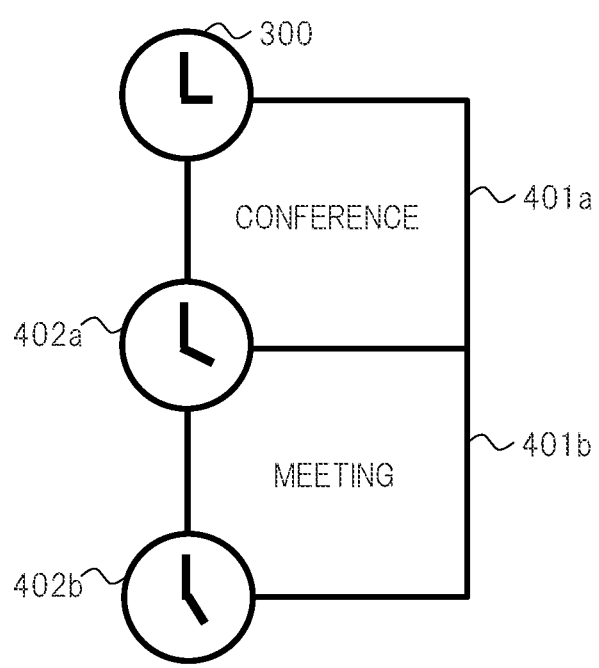
FIG. 6 is a diagram illustrating a display example including a clock displayed as AR.

Here, a display example including a clock displayed as AR will be described with reference to FIG. 6. FIG. 6 is a diagram illustrating a display example including a clock displayed as AR.

As illustrated in FIG. 6, the display controller 17 displays the content 401a of schedule information whose start time is a current time immediately below the position of the clock 300, and displays an AR clock 402a that indicates an end time of the content 401a of the schedule information. Further, the display controller 17 also displays the content 401b of schedule information whose start time is a time of the AR clock 402a and an AR clock 402b that indicates an end time of the content 401b of the schedule information.

Further, the example in which the display device 100 displays the schedule information around the analog clock has been described in the embodiment described above. However, the schedule information may be displayed around a digital wristwatch of the user. Here, an example in which schedule information is displayed around a digital wristwatch will be described with reference to FIG. 7. FIG. 7 is a diagram illustrating a display example of a digital wristwatch.

FIG. 7(a) is an example in which the display controller 17 displays the content 401c of a schedule and the content 401d of a schedule around a clock portion 310 of a wristwatch. FIG. 7(b) is an example in which the display controller 17 displays the content 401e of a schedule and the content 401f of a schedule around the clock portion 310 of the wristwatch. Information on a start time is also contained each of the content 401e of the schedule and the content 401f of the schedule.

The display controller 17 may display the schedule of a plurality of days superimposed in a depth direction around the clock portion 310 of the wristwatch. Further, the schedule to be displayed may be changed in accordance with an operating state of the wristwatch. For example, in a case where the wristwatch is pulled to hands of the user, the display controller 17 may preferentially display the latest schedule information.

Although it has not been mentioned particularly in the embodiment described above, the display controller 17 may change a display position of the schedule information being displayed in accordance with measured results of the gyro sensor 152, the geomagnetic sensor 153, and the acceleration sensor 154. As a result, in the display device 100, the display controller 17 can control the schedule information so that a positional relationship between the real object and the schedule information to be displayed does not change from the position of the line of sight of the user to follow this even though the user changes his or her posture, and display the schedule information.

Note that in a case where the movement state determining unit 14 determines that the user is moving, the display controller 17 may be configured to transition to detailed schedule information as a schedule corresponding to a situation that the user is moving, display and output the detailed schedule information.

For example, it is assumed that there are schedule information "business trip" in an upper concept and detailed schedule information of "business trip" in a lower concept. It is assumed that information on a route during moving of a business trip is contained as the detailed schedule information of the business trip. In a case where the movement state determining unit 14 determines that a user is in a company on the basis of positional information obtained by the positional information obtaining unit 13 and a real object such as a clock is recognized, the display controller 17 displays the schedule information of the "business trip" in accordance with a position of the clock. Further, in a case where the movement state determining unit 14 determines that the user leaves the company on the basis of the positional information obtained by the positional information obtaining unit 13 and the real object such as the clock is recognized, the display controller 17 displays the detailed schedule information of the business trip in accordance with the position of the clock.

The display device 100 switches the schedule information to be displayed in accordance with a movement state of the user in this manner, whereby it is possible to display and output the schedule information according to the situation.

In a case where the real object regarding to a date is a calendar, the display controller 17 may specify a date to be watched in the calendar, and display a detailed schedule of the date. Further, when the display controller 17 is displaying the schedule information on the calendar and it is detected that the user watches a month name for a certain period of time (a reference time defined in advance, for example, 5 seconds), and then the line of sight of the user moves sideways, the display controller 17 may display schedules of months before and after the month. The display controller 17 may display the schedules of months before and after the month at a side portion, an upper portion, or a lower portion of the calendar as a display destination.

Further, when the display controller 17 is displaying the schedule information on the calendar and it is detected that the user watches a year for a certain period of time (a reference time defined in advance, for example, 5 seconds), and then the line of sight of the user moves sideways, the display controller 17 may display schedules of the same months of years of before and after the year. The display controller 17 may display the schedules of the same months of the years before and after the years at a side portion, an upper portion, or a lower portion of the calendar as a display destination.

As described above, in the display device 100, the photographing unit 12 photographs the surroundings of the display device 100, and the recognizing unit 16 recognizes the clock 300 (the real object regarding the time or date) from the result of the photographing. When the recognizing unit 16 recognizes the clock 300, the schedule obtaining unit 11 obtains the schedule information, and the display controller 17 displays and outputs the schedule information in accordance with the position of the clock 300.

In this case, the display device 100 displays the schedule information in accordance with the position of the clock 300. Therefore, it is possible to display the schedule information in association with actual environment, and it is possible to output the schedule information in a format that is easier to recognize.

Further, the display controller 17 compares the time of the clock 300 recognized by the recognizing unit 16 with the internal clock. In a case where the difference is significant, the display controller 17 outputs the information indicating that effect. In this case, the display device 100 can call user's attention to a gap between the displayed schedule information and the time of the clock 300.

A part or all of the functions and the like described above of the present invention may be realized by hardware that is designed by an integrated circuit, for example. Further, the functions and the like may also be realized by software so that a microprocessor unit or the like interprets operation programs realizing the respective functions and executes the interpreted operation programs. Hardware and software may be used together.

Further, control lines and information lines illustrated in figures are illustrated so long as they are thought to be necessary for explanation. All of the control lines and the information line are not necessarily illustrated on a product. In fact, it may be considered that almost all of the components are connected to each other.

REFERENCE SIGNS LIST

11 . . . schedule obtaining unit, 12 . . . photographing unit, 13 . . . positional information obtaining unit, 14 . . . movement state determining unit, 15 . . . line-of-sight detector, 16 . . . recognizing unit, 17 . . . display controller, 100 . . . display device, 101 . . . main controller, 102 . . . bus, 103 . . . RAM, 110 . . . storage, 120 . . . operation input unit, 121 . . . operation keys, 122 . . . touch sensor, 123 . . . touch panel, 130 . . . image processor, 131 . . . display unit, 132 . . . image signal processor, 133 . . . first image input unit, 134 . . . second image input unit, 150 . . . sensor unit, 151 . . . GPS receiver, 152 . . . gyro sensor, 153 . . . geomagnetic sensor, 154 . . . acceleration sensor, 155 . . . depth sensor, 160 . . . communication processor, 170 . . . extension I/F unit.

The invention claimed is:

1. A display device for displaying schedule information, a user being allowed to wear the display device, the display device comprising:
   an internal clock which manages a time;
   an imaging device configured to photograph surroundings of the display device;
   a processor connected to a memory storing instructions that when executed by the processor configure the processor to:
   obtain schedule information; and
   recognize a real object regarding a time or date from a result photographed by the imaging device, wherein the real object is a clock; and
   a display controller configured to display and output the schedule information in accordance with a position of the real object regarding the time or date upon recognizing the real object regarding the time or date,
   wherein a time of the clock is recognized,
   wherein the display controller is configured to compare the time of the clock that is recognized with the time managed by the internal clock of the display device, and
   wherein the display controller is configured to output, upon a difference occurring as a result of the comparison, information indicating that the recognized time of the clock and the time managed by the internal clock are different from each other.

2. The display device according to claim 1, further comprising the processor being configured to:
   obtain positional information, the positional information being information regarding a position of the display device,
   wherein the schedule information is associated with category information, and
   wherein the display controller is further configured to display and output schedule information associated with category information corresponding to the obtained positional information.

3. The display device according to claim 2, further comprising the processor being configured to:
   determine whether the user is moving or not on a basis of a change in the obtained positional information,
   wherein upon the determining that the user is moving, the display controller is further configured to transition to detailed schedule information as a schedule corresponding to a situation that the user is moving, and display and output the detailed schedule information.

4. The display device according to claim 1, further comprising:
   a line-of-sight detector configured to detect a line of sight of the user,
   wherein upon the line of sight detected by the line-of-sight detector corresponds to the recognized position of the real object, the display controller is configured to display and output the obtained schedule information in accordance with the position of the real object regarding the time or date.

5. A display method executed by a display device for displaying schedule information, a user being allowed to wear the display device, the display method comprising:
   a schedule obtaining step of obtaining schedule information;

a photographing step of photographing surroundings of the display device;

managing a time with an internal clock;

a recognizing step of recognizing a real object regarding a time or date from a result photographed in the photographing step; and a display controlling step of displaying and outputting the schedule information obtained in the schedule obtaining step in accordance with a position of the real object regarding the time or date in a case where the real object regarding the time or date is recognized in the recognize step;

wherein the real object is a clock, wherein the recognizing step comprises a step of recognizing a time of the clock, wherein the display controlling step includes:

a step of comparing the time of the clock recognized by the recognizing step with the time managed by the internal clock of the display device, and a step of outputting, upon a difference resulting from a difference as a result of the comparison, information indicating that the time of the clock recognized by the recognizing step and the time managed by internal clock are different from each other.

\* \* \* \* \*